US007619397B2

(12) United States Patent
Al-Shyoukh

(10) Patent No.: US 7,619,397 B2
(45) Date of Patent: Nov. 17, 2009

(54) SOFT-START CIRCUIT FOR POWER REGULATORS

(75) Inventor: Mohammad A. Al-Shyoukh, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 139 days.

(21) Appl. No.: 11/935,734

(22) Filed: Nov. 6, 2007

(65) Prior Publication Data

US 2009/0115379 A1 May 7, 2009

Related U.S. Application Data

(60) Provisional application No. 60/865,764, filed on Nov. 14, 2006.

(51) Int. Cl.
*H02M 1/36* (2007.01)
*G05F 1/575* (2006.01)

(52) U.S. Cl. ........................ 323/281; 323/316; 323/901

(58) Field of Classification Search ................. 323/273, 323/274, 281, 311, 313, 314, 315, 316, 901; 363/49

See application file for complete search history.

(56) References Cited

U.S. PATENT DOCUMENTS

| | | | | |
|---|---|---|---|---|
| 6,617,833 | B1 | 9/2003 | Xi | |
| 7,170,352 | B1 | 1/2007 | Caldwell | |
| 7,218,080 | B2 | 5/2007 | Yang | |
| 7,405,549 | B2 * | 7/2008 | Kitagawa | 323/282 |
| 7,459,891 | B2 * | 12/2008 | Al-Shyoukh et al. | 323/274 |
| 2004/0027106 | A1 | 2/2004 | Martins | |
| 2007/0057649 | A1 | 3/2007 | Yang | |

* cited by examiner

*Primary Examiner*—Gary L Laxton
(74) *Attorney, Agent, or Firm*—William B. Kempler; Wade J. Brady, III; Frederick J. Telecky, Jr.

(57) ABSTRACT

One embodiment of the present invention includes a system for providing a soft-start for a power regulator comprising a differential transistor pair that receives an input current and conducts a first current through a first transistor and a second current through a second transistor. One of the first and second current changes in response to a change in the other to maintain a sum of the first and second current being substantially equal to the input current. The system also comprises a comparator that provides an output signal based on a comparison of a first input voltage and a second input voltage associated with the first current and the second current, respectively. The system further comprises a current source activated by the output signal to charge a capacitor that increases a soft-start reference voltage associated with control of the power regulator and which controls the change in the other of the first and second current.

20 Claims, 4 Drawing Sheets

SOFT-START CIRCUIT FOR POWER REGULATORS

This invention claims priority of Provisional Application No. 60/865,764, filed Nov. 14, 2006.

TECHNICAL FIELD

This invention relates to electronic circuits, and more specifically to a soft-start circuit for power regulators.

BACKGROUND

Linear and switch-mode voltage regulators constitute fundamental building blocks of today's power management integrated circuits (ICs). In switch mode voltage regulators, the output voltage is almost always soft-started upon enabling the regulator. In linear and low-dropout regulators (LDOs), the requirements usually depend on the application, and can either be implemented as a soft-startup or a fast-startup. One important requirement that can drive the need for soft-starting a given voltage regulator is the prevention of excessive inrush currents resulting from a power-up transient.

In portable device applications which utilize Universal Serial Bus (USB) communications, prevention of excessive inrush currents upon startup can be very important. Specifically, the USB standard can impose very strict requirements regarding an amount of current that can be provided on a USB power bus. As a result, it may be highly desirable to soft-start one or more power regulators on the USB power bus. In addition, regulator controllers that rely on external power devices may require flexible use of a wide range of off-chip power devices having been provided from different manufacturers. Because external power devices can greatly vary with regard to voltage/current (V/I) characteristics, soft-starting may be important to mitigate damage to the external power elements or to mitigate fault conditions due to excessive inrush current.

A variety of soft-start devices have been implemented to mitigate inrush current. However, there is an ever increasing demand for power regulation circuitry and other consumer electronics to operate with increased efficiency and at a reduced size. In addition, there is a current trend of integrating numerous linear, low-dropout, and switching regulators into common power management ICs. Therefore, a soft-starting circuit having a compact and efficient design is desirable to reduce silicon die-are and cost.

SUMMARY

One embodiment of the present invention includes a system for providing a soft-start for a power regulator comprising a differential transistor pair that receives an input current and conducts a first current through a first transistor and a second current through a second transistor. One of the first and second current changes in response to a change in the other to maintain a sum of the first and second current being substantially equal to the input current. The system also comprises a comparator that provides an output signal based on a comparison of a first input voltage and a second input voltage associated with the first current and the second current, respectively. The system further comprises a current source activated by the output signal to charge a capacitor that increases a soft-start reference voltage associated with control of the power regulator and which controls the change in the other of the first and second current.

Another embodiment of the present invention includes a method for providing a soft-start for a power regulator. The method comprises asserting an enable signal and activating a current flow through a differential pair of transistors in response to the enable signal. The current flow can be divided as a first current through a first transistor of the differential pair and a second current through a second transistor of the differential pair. The method also comprises setting a first voltage associated with the first current across a first resistor and a second voltage associated with the second current across a second resistor. The method also comprises charging a capacitor to increase a soft-start reference voltage associated with control of the power regulator in response to the second voltage being greater than the first voltage. The method further comprises increasing the first voltage in response to increasing the soft-start reference voltage and coupling the soft-start reference voltage to an input reference voltage associated with power regulation of the power regulator upon the first voltage becoming substantially equal to the second voltage.

Another embodiment of the present invention includes a system for providing a soft-start for a power regulator. The system comprises means for generating a first current and a second current. One of the first current and the second current changes in response to a change in the other of the first current and second current based on an increase of a soft-start reference voltage associated with control of the power regulator. A sum of the first current and the second current can be substantially constant. The system also comprises means for generating a first voltage and a second voltage based, respectively, on the first current and the second current. The system also comprises means for comparing the first voltage and the second voltage and for providing an output signal in response to the comparison of the first voltage and the second voltage. The system further comprises means for charging a capacitor to increase the soft-start reference voltage in response to the output signal.

DETAILED DESCRIPTION

The present invention relates to electronic circuits, and more specifically to a soft-start circuit for power regulators. Upon assertion of an enable signal, a bias current is mirrored to a differential transistor pair. The differential transistor pair can include a pair of transistors having an unequal ratio of width-to-length (W/L). The mirrored bias current can be divided between the pair of transistors unevenly based on respective bias voltages at the gates of the transistors. The current flow through the transistors can set voltages across resistors that are interconnected to ground. The voltages can be provided to a comparator that provides an output signal to a current supply that charges a capacitor. The voltage across the capacitor can correspond to a soft-start reference voltage that can be used for a soft-start of a power regulator.

The soft-start reference voltage can also be provided as a bias voltage to one of the transistors of the differential pair. Therefore, the currents through the differential pair transistors, and thus the voltages at the input of the comparator, change in response to the increase of the soft-start reference voltage. Upon the voltages at the input of the comparator becoming equal, the comparator output signal deactivates the current supply to the capacitor and couples the soft-start reference voltage to an input reference voltage that is associated with the power regulator. In addition, the output signal also sets the voltages at the input of the comparator to latch the soft-start reference voltage, thus completing the soft-start of the power regulator.

Figure 1:
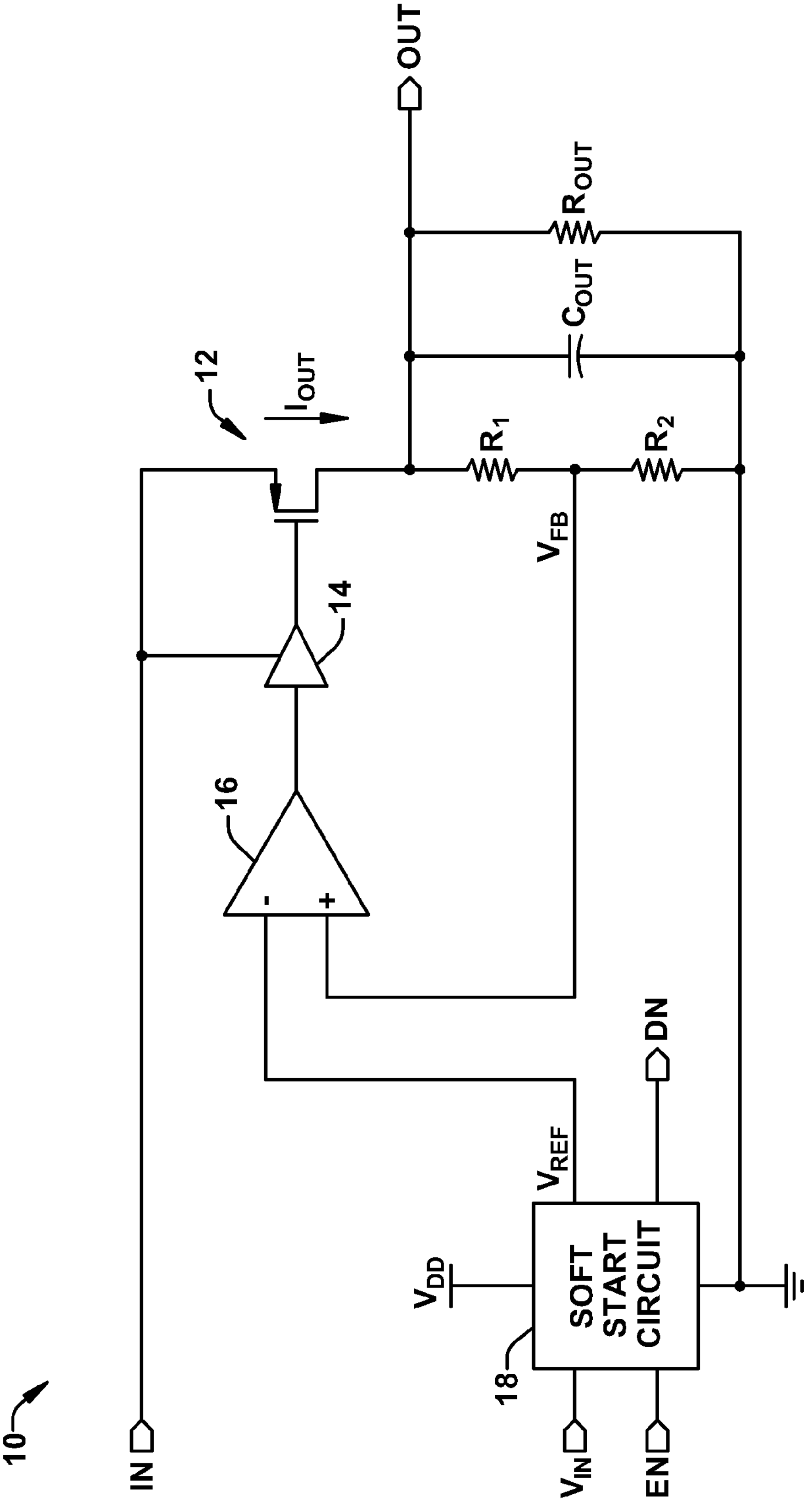
FIG. 1 illustrates an example of a power regulator in accordance with an aspect of the invention.

FIG. 1 illustrates an example of a power regulator 10 in accordance with an aspect of the invention. The power regulator 10 in the example of FIG. 1 is demonstrated as a low-dropout (LDO) regulator. The power regulator 10 includes a power element 12, demonstrated as a P-type field effect transistor (P-FET), that interconnects an input voltage IN with an output voltage OUT. The output voltage OUT is separated from a negative supply voltage, demonstrated in the example of FIG. 1 as ground, by an output capacitor $C_{OUT}$ and an output resistor $R_{OUT}$ representing a load of the power regulator 10. Therefore, the magnitude of the output voltage OUT during power-on transients can be based on the output capacitor $C_{OUT}$ that is charged by a current $I_{OUT}$ through the power element 12.

A gate control of the power element 12 can be controlled by a driver 14. The driver 14 can set the gate control voltage of the power element 12 in response to the magnitude of the output voltage OUT, such that the gate control voltage can be adjusted to maintain a substantially constant desired magnitude of the output voltage OUT. Therefore, a pair of feedback resistors $R_1$ and $R_2$ are configured between the output voltage OUT and ground to provide a feedback voltage $V_{FB}$ to an error amplifier 16. The error amplifier 16 is thus configured to monitor the feedback voltage $V_{FB}$ relative to a reference voltage $V_{REF}$ and to provide a control signal to the driver 14 based on the magnitude of the feedback voltage $V_{FB}$ relative to the reference voltage $V_{REF}$. As such, the driver 14 can control the gate of the power element 12, and thus the current sourced by the power element 12, to maintain the output voltage OUT at a magnitude that is proportional to the reference voltage $V_{REF}$.

Upon initialization of the power regulator 10, a very low gate control voltage of the power element 12 can result in an excessive inrush magnitude of the current $I_{OUT}$ due to a large source-to-gate voltage $V_{SG}$ of the power element 12. Such an excessive inrush current can result in damage to, for example, the power element 12 and/or a source of the input voltage IN (e.g., a battery). To prevent the excessive inrush magnitude of the current $I_{OUT}$, the power regulator 10 can include a soft-start circuit 18. The soft-start circuit 18 can be configured to slowly increase the magnitude of the reference voltage $V_{REF}$ to the error amplifier 16. As a result, the reference voltage $V_{REF}$ can be provided to the error amplifier 16 as a soft-start reference voltage, such that the output of the error amplifier 16 does not indicate a large difference between the feedback voltage $V_{FB}$ and the reference voltage $V_{REF}$ to the driver 14. Accordingly, as the soft-start reference voltage $V_{REF}$ increases, the driver 14 sets a gradually decreasing gate control voltage to mitigate excessive inrush of the current $I_{OUT}$.

The soft-start circuit 18 is powered by a positive supply voltage $V_{DD}$ and ground, and receives an enable signal EN and an input reference voltage $V_{IN}$ as inputs. The input voltage $V_{IN}$ can be an input reference voltage, such as a desired bandgap reference voltage (e.g., 1.2V) for the error amplifier 16. For example, the input reference voltage $V_{IN}$ can have a magnitude to which the soft-start reference voltage $V_{REF}$ ultimately becomes equal at the completion of the soft-start. Upon completion of the soft-start, the soft-start circuit 18 can provide a completion signal DN, which can be implemented by any of a variety of circuit components internal or external to the power regulator 10 that can indicate the completion of the soft-start. The enable signal EN can be a signal that is asserted (i.e., logic-high) to initiate the soft-start of the power regulator 10, such that the reference voltage $V_{REF}$ can begin increasing from a low voltage potential (e.g., ground) to the input reference voltage $V_{IN}$. The enable signal EN can also be deasserted (i.e., logic-low) to reset the soft-start, thus setting the magnitude of the soft-start reference voltage $V_{REF}$ back to the low voltage potential.

It is to be understood that the power regulator 10 is not intended to be limited to the example of FIG. 1. For example, the power element 12 could be configured as an N-type FET instead of a P-FET in the LDO regulator demonstrated by the power regulator 10. In addition, it is to be understood that soft-start circuit 18 is not intended to be limited to use in a LDO regulator, but could be implemented in a switching regulator, a linear regulator, or any of a variety of other power regulators. Therefore, the power regulator 10 can be configured in any of a variety of ways.

Figure 2:
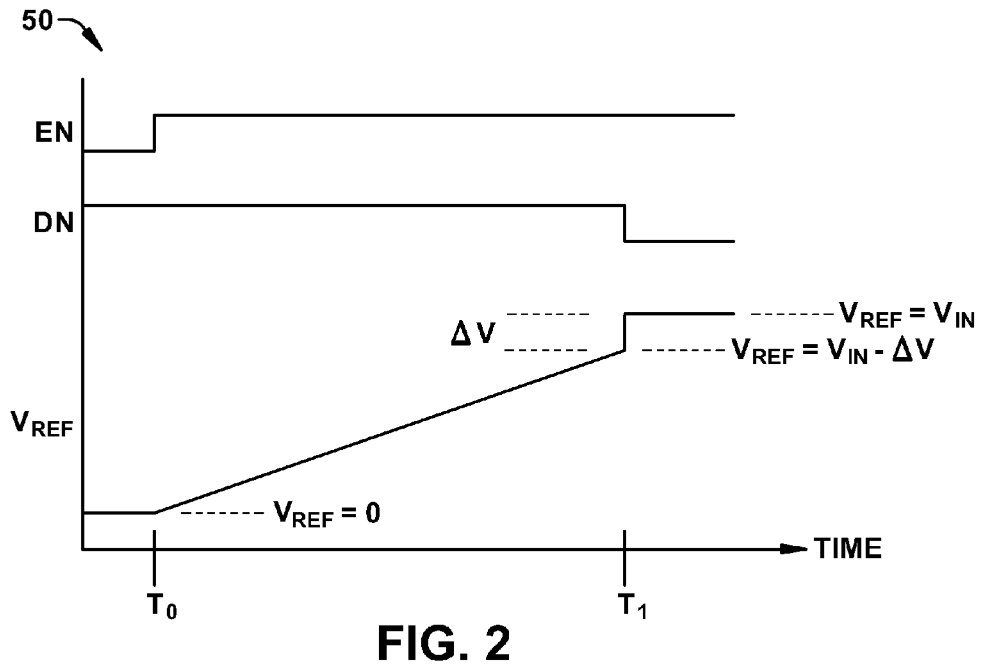
FIG. 2 illustrates an example of a timing diagram associated with a power regulator in accordance with an aspect of the invention.

FIG. 2 illustrates an example of a timing diagram 50 associated with a power regulator in accordance with an aspect of the invention. The timing diagram 50 can be a timing diagram associated with the power regulator 10 in the example of FIG. 1. Therefore, reference is to be made to the example of FIG. 1 in the following description of the example of FIG. 2. In addition, it is to be understood that the timing diagram 50 is demonstrated as an ideal timing diagram in the example of FIG. 2. Therefore, delays and/or variations in the signals such as could be inherent in the power regulator 10 in the example of FIG. 1 may not be demonstrated in the example of FIG. 2.

The timing diagram 50 demonstrates the enable signal EN, the completion signal DN, and the soft-start reference voltage $V_{REF}$. It is to be understood that the completion signal DN, has an opposite logic state to signify completion of the soft-start. Specifically, as described herein, the completion signal DN is asserted to indicate that the soft-start is not completed, and is deasserted to indicate that the soft-start is completed.

Prior to a time $T_0$, the enable signal EN is logic-low, the completion signal DN is logic-high, and the soft-start reference voltage $V_{REF}$ has a magnitude of zero volts. At the time $T_0$, the enable signal EN is asserted, thus beginning the soft-start of the power regulator 10. Therefore, at the time $T_0$, the soft-start reference voltage $V_{REF}$ begins to increase linearly. Accordingly, subsequent to the time $T_0$, the error amplifier 16 compares the feedback voltage $V_{FB}$ with the steadily increasing soft-start reference voltage $V_{REF}$, and thus the driver 14 gradually varies the gate control voltage of the power element 12 to mitigate inrush of the output current $I_{OUT}$.

At a time $T_1$, the completion signal DN is asserted, thus signifying the completion of the soft-start. In addition, at the time $T_1$, the soft-start reference voltage $V_{REF}$ is pulled-up to a voltage potential that is approximately equal to the input reference voltage $V_{IN}$. As such, at a time subsequent to the time $T_1$, the error amplifier 16 compares the feedback voltage $V_{FB}$ with the input reference voltage $V_{IN}$ for which the power regulator 10 is intended to operate in a typical, steady-state operation.

In the example of FIG. 2, at a time just prior to the time $T_1$, the timing diagram 50 demonstrates that the soft-start reference voltage $V_{REF}$ has a magnitude that is less than the input reference voltage $V_{IN}$ by a predetermined handoff voltage having a magnitude of ΔV. The magnitude of the predetermined handoff voltage ΔV can be set based on a desired slope of the soft-start reference voltage $V_{REF}$ versus a desired time at which to complete the soft-start. As an example, circuit design parameters that affect the slope of the soft-start reference voltage $V_{REF}$ and the time $T_1$ may be unrelated, such that a handoff of the magnitude of the soft-start reference voltage $V_{REF}$ from a current value to the potential of the input reference voltage $V_{IN}$ may occur at the time $T_1$, regardless of the potential of the soft-start reference voltage $V_{REF}$. However, as described above, the predetermined magnitude ΔV can be set based on design parameters of the soft-start circuit 18, as described in greater detail below.

Figure 3:
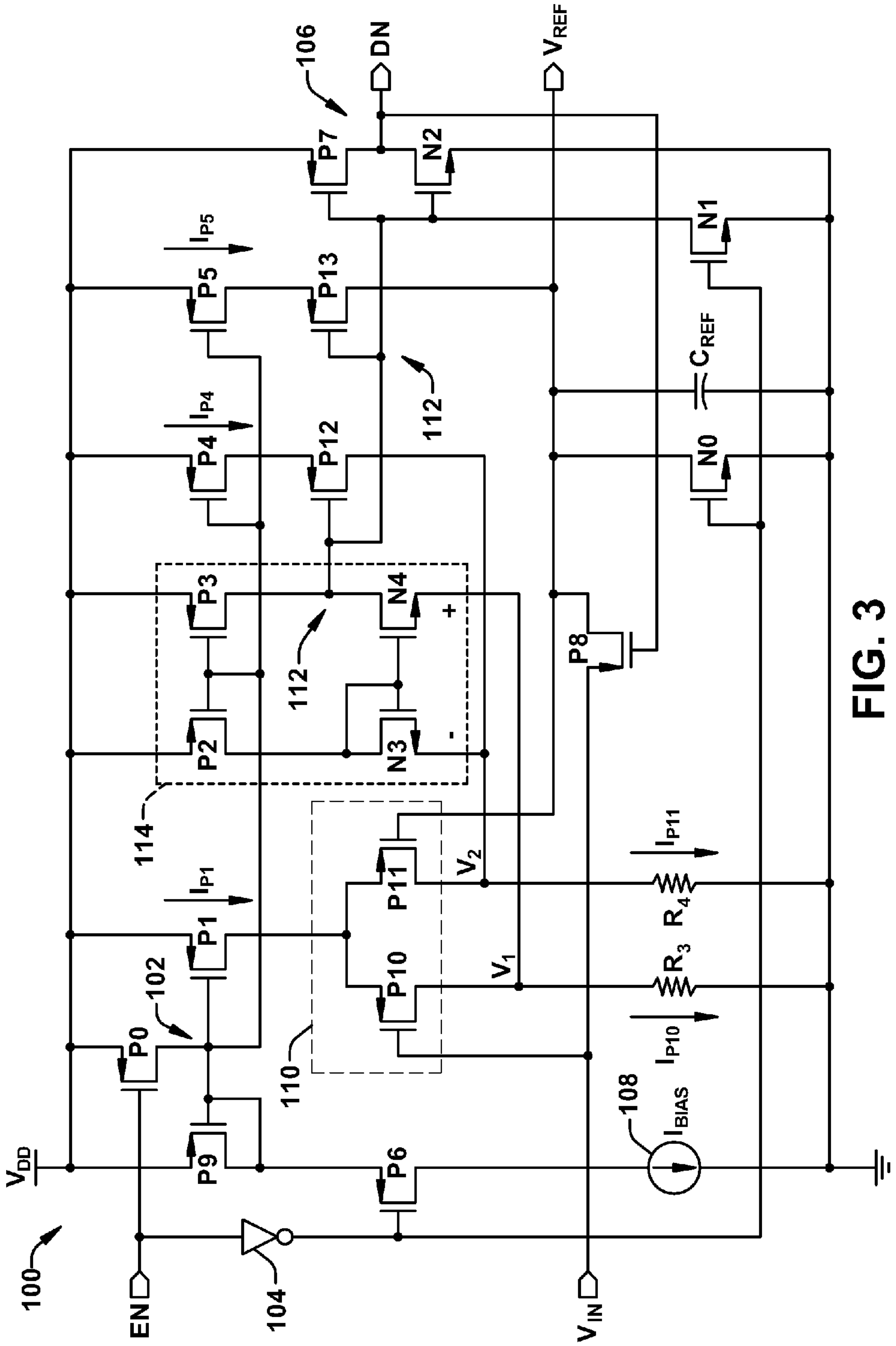
FIG. 3 illustrates an example of a soft-start circuit in accordance with an aspect of the invention.

FIG. 3 illustrates an example of a soft-start circuit 100 in accordance with an aspect of the invention. The soft-start circuit 100 can be configured substantially similar to the soft-start circuit 18 in the example of FIG. 1. Therefore, reference is to be made to the examples of FIGS. 1 and 2 in the following description of the example of FIG. 3.

The soft-start circuit 100 is configured between a positive supply voltage $V_{DD}$ and a negative supply voltage, demonstrated in the example of FIG. 3 as ground. At the time prior to the time $T_0$, the enable signal EN is deasserted. Therefore, a P-FET P0 is activated to pull-up a node 102 to the positive supply voltage $V_{DD}$. Accordingly, P-FETs P1, P2, P3, P4, and P5 are all deactivated. The enable signal EN is provided through an inverter 104, such that the output of the inverter 104 is logic-high prior to the time $T_0$. Therefore, a P-FET P6 is also deactivated, and an N-FET N0 and an N-FET N1 are both activated. Thus, the N-FET N0 sinks the soft-start reference voltage $V_{REF}$ down to ground (i.e., $V_{REF}=0$), and the N-FET N1 provides a logic-low signal to an inverter 106 that is formed by a P-FET P7 and an N-FET N3. Accordingly, the completion signal DN at the output of the inverter 106 is logic-high, thus indicating that the soft-start is not complete, and a P-FET P8 that is biased by the completion signal DN is thus deactivated.

At the time $T_0$, the enable signal EN is asserted. The P-FET P0 becomes deactivated, and the P-FET P6 becomes activated. The soft-start circuit 100 includes a bias current source 108 that is configured to conduct a bias current $I_{BIAS}$. The bias current source 108 is configured in series with a P-FET P9 that is diode-connected (i.e., common drain-gate connection) and has a drain-gate that is coupled to the node 102. Therefore, upon activation of the P-FET P6, the bias current $I_{BIAS}$ is mirrored to each of the P-FETs P1-P5 via the P-FET P9. It is to be understood that the amount of current through the P-FETs P1-P5 may vary relative to each other based on variations in the sizes of the P-FETs P1-P5 (e.g., W/L ratio).

A current $I_{P1}$, flows through the P-FET P1 into a differential transistor pair 110 that includes a P-FET P10 and a P-FET P11. The current $I_{P1}$ becomes divided between the P-FETs P10 and P11 as currents $I_{P10}$ and $I_{P11}$, respectively. Because the current $I_{P1}$ is constant based on the mirroring of the bias current $I_{BIAS}$ through the P-FET P9, the sum of the currents $I_{P10}$ and $I_{P11}$ is likewise constant. The currents $I_{P10}$ and $I_{P11}$ also flow, respectively, through resistors $R_3$ and $R_4$, which can each have substantially equal resistance values. Therefore, the current $I_{P10}$ generates a voltage $V_1$ at a node between the P-FET P10 and the resistor $R_3$ and the current $I_{P11}$ generates a voltage $V_2$ at a node between the P-FET P11 and the resistor $R_4$.

The P-FETs P10 and P11 that form the differential transistor pair 110 can be configured to be unequal in size. Specifically, the P-FET P10 can have a width-to-length (W/L) ratio that is greater than a W/L ratio of the P-FET P11. The difference in W/L ratio of the P-FETs P10 and P11 can be predetermined such that, at a balanced state of the differential transistor pair 110, such that the current $I_{P10}$ and the current $I_{P11}$ are substantially equal, a voltage at the gate of the P-FET P11 is less than a voltage at the gate of the P-FET P10. As described in greater detail below, the difference in gate voltage of the P-FET P10 and the P-FET P11 corresponds to the predetermined handoff voltage ΔV.

The voltages $V_1$ and $V_2$ are provided, respectively, to source terminals of an N-FET N3 and an N-FET N4. The N-FET N3 receives a mirrored current through the P-FET P2 and is diode-connected. The N-FET N4 receives a mirrored current through the P-FET P3, which is substantially equal to the current through the P-FET P2, and is coupled to the P-FET P3 at a node 112. Therefore, in the example of FIG. 3, the P-FET P2, the P-FET P3, the N-FET N3, and the N-FET N4 constitute a comparator 114. The comparator 114 is demonstrated in the example of FIG. 3 such that the voltage $V_2$ is provided to an inverting input "–" and the voltage $V_1$ is provided to a non-inverting input "+". The node 112 is thus configured as an output of the comparator 114.

The comparator 114 can be configured to have a gain that is defined by a transconductance of the N-FET N4 times an output-impedance observed at the node 112. The comparator 114 is configured to compare the voltage $V_1$ and the voltage $V_2$, and to provide a logic-high or logic-low output signal at the node 112 that corresponds to which of the voltage $V_1$ and $V_2$ is greater. The voltage swing between the logic-low and the logic-high states of the comparator 114 can be set based on the magnitude of the resistors $R_3$ and $R_4$. For example, the resistors $R_3$ and $R_4$ can be sized such that the voltages $V_1$ and $V_2$, respectively, achieve a voltage potential that is no greater than approximately 100 mV to maximize the voltage swing at the node 112.

In the example of FIG. 1, the P-FET P10 in the differential transistor pair 110 has a gate that is coupled to the input reference voltage $V_{IN}$, and the P-FET P11 in the differential transistor pair 110 has a gate that is coupled to the soft-start reference voltage $V_{REF}$. Therefore, at the time $T_0$, the P-FET P10 is substantially completely deactivated and the P-FET P11 is substantially completely activated. Thus, the current $I_{P1}$ initially flows substantially entirely through the P-FET P11 as the current $I_{P11}$. Accordingly, the voltage $V_2$ is substantially greater than the voltage $V_1$. As a result, the comparator 114 provides a logic low signal at the node 112. In response, the logic-low state of the node 112 activates a P-FET P12 and maintains the logic-low input to the inverter 106.

Upon activation of the P-FET P13, the P-FET P4 begins to mirror the bias current $I_{BIAS}$ as a current $I_{P4}$ through the P-FET P12. It is to be understood that the bias current $I_{BIAS}$ and the current $I_{P4}$ may be different relative to each other, as explained above. The current $I_{P4}$ is thus provided to the voltage $V_2$, and thus further increases the magnitude of the voltage $V_2$. In addition, the activation of the P-FET P13 provides a mirrored current $I_{P5}$ to flow through the P-FET P13. The current $I_{P5}$ thus charges a capacitor $C_{REF}$ that interconnects the soft-start reference voltage $V_{REF}$ and ground. Accordingly, the voltage across the capacitor $C_{REF}$ is equal to the soft-start reference voltage $V_{REF}$, which gradually increases as the capacitor $C_{REF}$ is charged with the current $I_{P5}$.

As described above, the gate of the P-FET P11 is controlled by the soft-start reference voltage $V_{REF}$. Thus, as the soft-start reference voltage $V_{REF}$ increases, the resistance of the P-FET P11 begins to increase. Therefore, because the sum of the currents $I_{P10}$ and $I_{P11}$ is constant, the current $I_{P10}$ begins to increase relative to the current $I_{P11}$. As a result, the voltage $V_1$ likewise begins to increase relative to the voltage $V_2$. Upon the voltage $V_1$ becoming substantially equal to the voltage $V_2$, the comparator 114 switches to a logic-high output at the node 112. Accordingly, at approximately the time $T_1$ in the example of FIG. 2, the P-FET P12 and the P-FET P13 deactivate, and the input to the inverter 106 becomes logic-high.

Upon deactivation of the P-FET P12, the current $I_{P4}$ is no longer provided to the voltage $V_2$. As a result, the voltage $V_2$ decreases relative to the voltage $V_1$, such as by an amount that is approximately equal to the current $I_{P4}$ divided by the transconductance of the P-FET P11. Therefore, the P-FET P12 acts as a shutoff switch that implements a hysteresis function on the comparator 114. Specifically, the shutoff of the P-FET P12 latches the output of the comparator 114. As such, a transient of the voltage $V_2$ that may occur would not change the state of the output of the comparator 114, thus would not reactivate the P-FET P12 and the P-FET P13 and change the state of the inverter 106. Therefore, the shutoff of the P-FET P12 latches the completion of the soft-start, and thus latches the soft-start reference voltage $V_{REF}$ to a constant value, as described below.

Upon deactivation of the P-FET P13, the current $I_{P5}$ is no longer provided to the capacitor $C_{REF}$. Therefore, the capacitor $C_{REF}$ stops charging and the soft-start reference voltage $V_{REF}$ is disconnected from the positive supply voltage $V_{DD}$. In addition, because the inverter 106 receives a logic-high input state, the inverter 106 provides an output state of the completion signal DN that is logic-low, thus signifying completion of the soft-start. Furthermore, the logic-low completion signal DN is provided to the gate of the P-FET P8, thus activating the P-FET P8 to couple the soft-start reference voltage $V_{REF}$ to the input reference voltage $V_{IN}$. As a result, at the completion of the soft-start, the soft-start reference voltage $V_{REF}$ is set at a constant value that is substantially equal to the input reference voltage $V_{IN}$.

As described above, the unequal sizes of the P-FETs P10 and P11 result in a gate voltage of the P-FET P11 being less than the gate voltage of the P-FET P10 when the currents $I_{P10}$ and $I_{P11}$, and thus the voltages $V_1$ and $V_2$, are substantially equal. Thus, upon the comparator switching the node 112 to a logic-high state at the completion of the soft-start, the soft-start reference voltage $V_{REF}$ can have a predetermined magnitude less than the input reference voltage $V_{IN}$ just prior to being coupled to the input reference voltage $V_{IN}$ by the P-FET P8. The predetermined difference between the soft-start reference voltage $V_{REF}$ and the reference voltage $V_{IN}$ can be the substantially equal to the handoff voltage $\Delta V$. As described above, the handoff voltage $\Delta V$ can be predetermined based on the W/L ratio of the P-FET P10 relative to the W/L ratio of the P-FET P11. In addition, the slope of the increase of the soft-start reference voltage $V_{REF}$ can be set based on either the size of the capacitor $C_{REF}$ or the magnitude of the current $I_{P5}$, such as by setting the size of the P-FET P5, appropriately.

It is to be understood that, upon the enable signal EN being switched back to a logic-low state, the soft-start circuit 100 is reset. Specifically, upon the enable signal EN being switched back to a logic-low state, the mirrored bias current $I_{BIAS}$ is disconnected from the P-FETs P1-P5 based on the activation of the P-FET P0 and the deactivation of the P-FET P6. In addition, the N-FET N0 is activated via the inverter 104, thus sinking the soft-start reference voltage $V_{REF}$ to ground. Furthermore, the N-FET N1 is likewise activated, thus providing a logic-low state to the input of the inverter 106. As a result, the completion signal DN becomes logic-high, indicating a non-complete status of the soft-start, and disconnecting the soft-start reference voltage $V_{REF}$ from the input reference voltage $V_{IN}$ via the P-FET P8. Accordingly, the soft-start circuit 100 returns to a status prior to the assertion of the enable signal EN.

It is to be understood that the soft-start circuit 100 is not intended to be limited to the example of FIG. 3. As an example, alternate configurations of the power supplies realized by the P-FETs P1-P5, the differential transistor pair 110, and/or the comparator 114 can be implemented in the soft-start circuit 100. For example, the resistance values of the resistors $R_3$ and $R_4$ can be set differently from one another to provide further or alternative control of the relative values of the voltages $V_1$ and $V_2$. Furthermore, different functions of the enable signal EN and/or the completion signal DN can also be implemented in the soft-start circuit 100. Therefore, the soft-start circuit 100 can be configured in any of a variety of ways.

Figure 4:
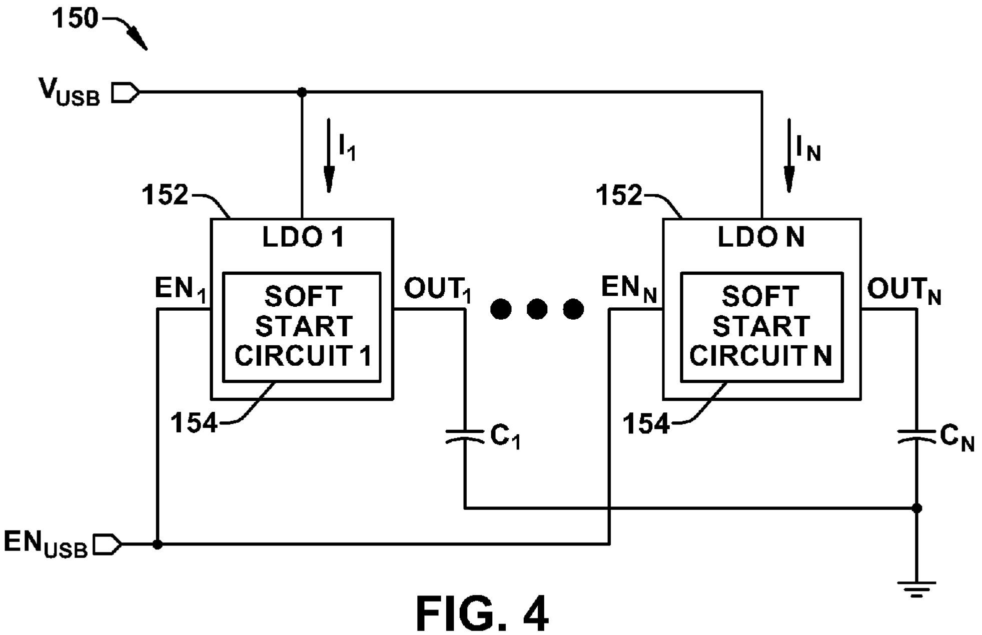
FIG. 4 illustrates an example of a universal serial bus (USB) power system in accordance with an aspect of the invention.

FIG. 4 illustrates an example of a universal serial bus (USB) power system 150 in accordance with an aspect of the invention. The USB power system 150 can be implemented in any of a variety of computer and/or communications devices. The USB power system 150 includes a plurality of power regulators 152, demonstrated as LDO 1 through LDO N in the example of FIG. 4, where N is a positive integer. Although the example of FIG. 4 demonstrates that the power regulators 152 are LDO regulators, it is to be understood that the USB power system 150 is not limited to the use of LDO regulators, and that the plurality of power regulators 152 is not limited to all being the same type of power regulator.

The power regulators 152 are coupled to a voltage supply $V_{USB}$ that is configured to provide current to each of the power regulators. In the example of FIG. 4, the current is demonstrated as $I_1$ through $I_N$, corresponding respectively to LDO 1 through LDO N. Each of the power regulators 152 is configured to provide an output voltage OUT to a respective output capacitor. Specifically, LDO 1 provides an output voltage $OUT_1$ to an output capacitor $C_1$, LDO N provides an output voltage $OUT_N$ to an output capacitor $C_N$, and so forth. The currents $I_1$ through $I_N$ that are provided to the power regulators 152 may therefore be subject to achieving excessive inrush magnitudes, such that the current capacity specification of the USB standard with regard to the supply voltage $V_{USB}$ can be violated.

To substantially mitigate inrush of the supply voltage $V_{USB}$, the power regulators 152 include a soft-start circuit 154, demonstrated in the example of FIG. 4 as numbering from 1 through N, respectively. Each of the soft-start circuits 154 can be configured substantially the same as the soft-start circuit 100 described in the example of FIG. 3. As an example, an enable signal bus $EN_{USB}$ can be provided to the power regulators 152, such that each of the soft-start circuits 154 can be separately enabled to provide a soft-start to mitigate inrush of the respective current provided from the supply voltage $V_{USB}$. As a result, inrush of the supply voltage $V_{USB}$ for the USB power system 150 can be substantially mitigated.

It is to be understood that the USB power system 150 is not intended to be limited to the example of FIG. 4. As an example, the USB power system 150 is illustrated very simplistically for ease of explanation, such that a number of other components may be included in the USB power system 150. In addition, not all of the power regulators 152 in the example of FIG. 4 may include soft-start circuits 154. For example, some of the power regulators 152 may not include soft-start circuits 154 based on having a less power-intensive operation, or for any of a variety of other reasons. Therefore, the USB power system 150 can be configured in any of a variety of ways.

Figure 5:
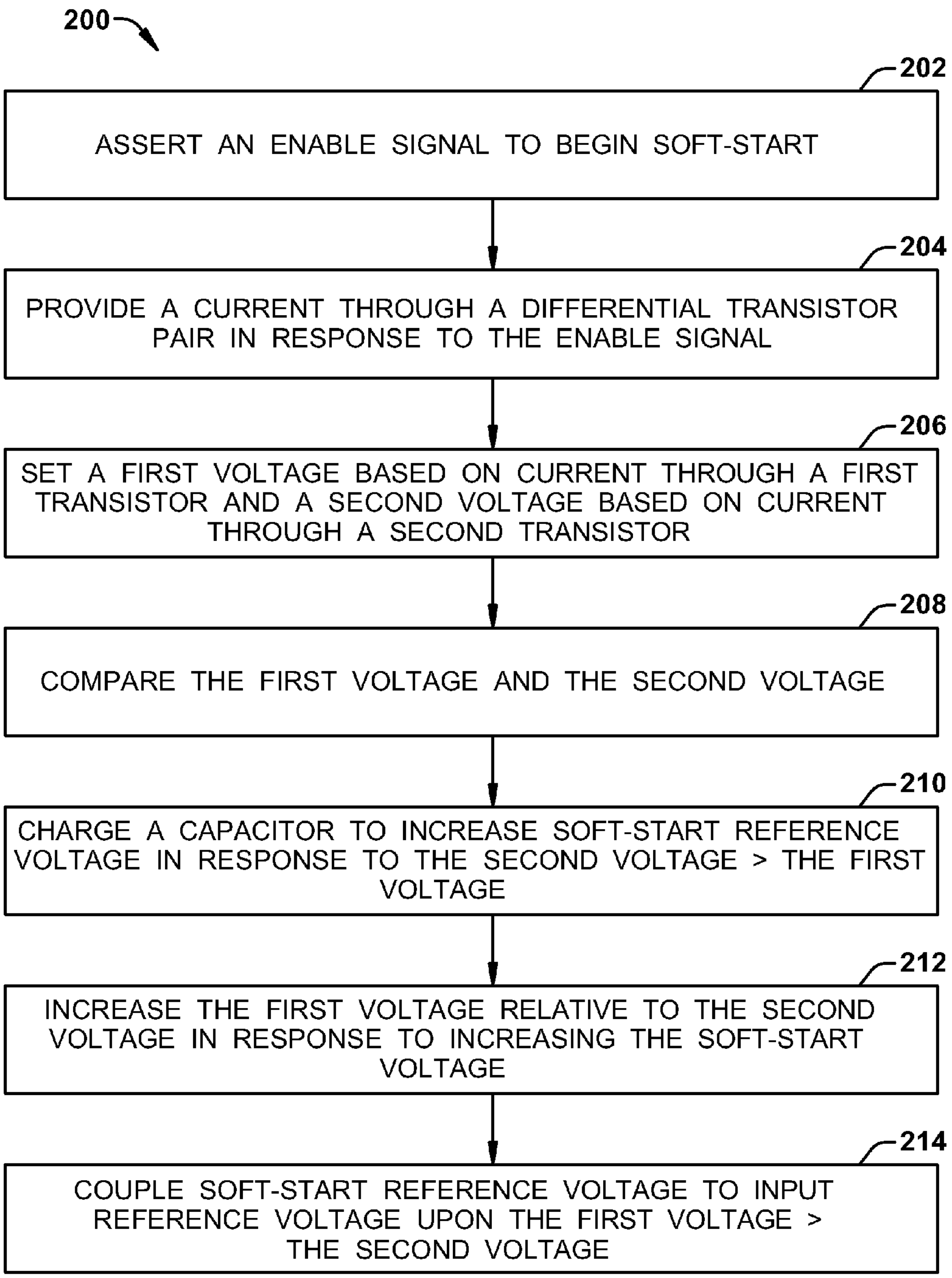
FIG. 5 illustrates an example of a method for soft-starting a power regulator in accordance with an aspect of the invention.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method.

FIG. 5 illustrates an example of a method 200 for soft-starting a power regulator in accordance with an aspect of the invention. At 202, an enable signal is asserted. The enable signal can be a signal to control the start of a soft-start of the power regulator. At 204, a current is provided through a differential transistor pair in response to the enable signal. The current can be a bias current that is mirrored to the differential pair in response to the enable signal. The differential transistor pair can include a pair of transistors having an unequal size relative to each other. The sum of the currents through the transistors of the differential transistor pair can be substantially constant.

At 206, a first voltage is set based on the current through a first of the transistors in the differential transistor pair, and a second voltage is set based on the current through a second transistor in the differential transistor pair. The pair of voltages can be based on the currents through the differential transistor pair flowing through a respective pair of resistors. At 208, the first voltage and the second voltage are compared. The comparison can be based on a comparator that is configured from a pair of N-FETs that are configured as a current mirror relative to each other, and are each provided an equal amount of current, with the pair of voltages being provided to their respective sources.

At 210, a capacitor is charged to increase a soft-start reference voltage associated with controlling the power regulator in response to the second voltage being greater than the first voltage. The charging of the capacitor can be based on a current supply that is activated by the output of the comparator. The soft-start reference voltage can be the voltage across the capacitor. At 212, the first voltage is increased relative to the second voltage in response to increasing the soft-start reference voltage. The soft-start reference voltage can be coupled to a gate of the transistor through which the second current flows, thus increasing the resistance of the second transistor.

At 214, the soft-start reference voltage is coupled to an input reference voltage associated with the power regulator upon the first voltage being greater than the second voltage. The input reference voltage can be a desired reference voltage for the power regulator in steady-state operation. The coupling of the soft-start reference voltage to the input reference voltage can occur as a result of a change of state of the comparator.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A system for providing a soft-start to a power regulator, the system comprising:

a differential transistor pair configured to receive an input current and to conduct a first current through a first transistor and a second current through a second transistor, such that one of the first current and the second current changes in response to a change in the other of the first current and the second current to maintain that a sum of the first current and the second current is substantially equal to the input current;

a comparator configured to provide an output signal based on a comparison of a first input voltage and a second input voltage that are associated with the first current and the second current, respectively; and a current source that is activated by the output signal to charge a capacitor that increases a soft-start reference voltage associated with control of the power regulator, the soft-start reference voltage also controlling the change in the other of the first current and the second current.

2. The system of claim 1, wherein a width-to-length (W/L) ratio associated with the first transistor is unequal to a W/L ratio associated with the second transistor.

3. The system of claim 2, wherein the differential transistor pair comprises a pair of resistors having a substantially equal resistance, the first input voltage and the second input voltage being set based on a the first current and the second current flowing through the respective pair of resistors.

4. The system of claim 2, further comprising a switch configured to couple the soft-start reference voltage to an input reference voltage that is associated with the power regulator upon the soft-start reference voltage being less than the input reference voltage by a predetermined magnitude, the predetermined magnitude being based on the W/L ratio of the first transistor relative to the W/L ratio of the second transistor.

5. The system of claim 1, wherein the comparator comprises a third transistor and a fourth transistor having a common gate and each having a drain coupled to a common current source, the third transistor being diode-connected and having a source coupled to the second input voltage, the fourth transistor having a source coupled to the first input voltage and a drain that is coupled to the output signal.

6. The system of claim 1, further comprising a bias current source configured to generate a bias current, the bias current being mirrored as the input current, the current source, and at least one current associated with the comparator.

7. The system of claim 1, wherein the output signal is configured to activate a shut-off switch that is configured to conduct a third current that contributes to the second input voltage as the soft-start reference voltage increases, the shut-off switch being deactivated upon the soft-start reference voltage achieving a predetermined magnitude to set the second input voltage less than the first input voltage to latch the soft-start reference voltage at a constant magnitude.

8. The system of claim 1, wherein the soft-start reference voltage is configured to control the second transistor, such that the first input voltage increases relative to the second input voltage as the soft-start reference voltage increases, the output signal changing state upon the first input voltage being substantially equal to the second input voltage.

9. The system of claim 8, wherein the output signal is provided to an inverter that is configured to couple the soft-start reference voltage to an input reference voltage that is associated with the power regulator upon the output signal changing state, the inverter being further configured to provide a control signal that indicates a completion of the soft-start.

10. The system of claim 1, wherein the input current and the current source are activated in response to asserting an enable signal, the enable signal deactivating the input current and the current source and coupling the soft-start reference voltage to a negative supply voltage upon being deasserted.

11. A power regulator comprising the system of claim 1.

12. A universal serial bus (USB) power system comprising the system of claim 1.

13. A method for providing a soft-start for a power regulator, the method comprising:

asserting an enable signal;

activating a current flow through a differential pair of transistors in response to the enable signal, the current flow being divided as a first current through a first transistor of the differential pair and a second current through a second transistor of the differential pair;

setting a first voltage associated with the first current across a first resistor and a second voltage associated with the second current across a second resistor;

charging a capacitor to increase a soft-start reference voltage associated with control of the power regulator in response to the second voltage being greater than the first voltage;

increasing the first voltage in response to increasing the soft-start reference voltage; and coupling the soft-start reference voltage to an input reference voltage associated with regulation of the power regulator upon the first voltage becoming substantially equal to the second voltage.

14. The method of claim 13, further comprising setting a width-to-length (W/L) ratio associated with the first transistor to be unequal to a W/L ratio associated with the second transistor.

15. The method of claim 14, further comprising setting a predetermined voltage magnitude based on the W/L ratio of the first transistor relative to the W/L ratio of the second transistor, the predetermined voltage magnitude being a difference between the input reference voltage and the soft-start reference voltage upon the first voltage becoming substantially equal to the second voltage.

16. The method of claim 13, further comprising:

providing a third current to increase a magnitude of the second voltage; and removing the third current to decrease the second voltage relative to the first voltage in response to the first voltage becoming substantially equal to the second voltage to latch the coupling of the soft-start reference voltage to the input reference voltage.

17. A system for providing a soft-start to a power regulator, the system comprising:

means for generating a first current and a second current, one of the first current and the second current changing in response to a change in the other of the first current and second current based on an increase of a soft-start reference voltage associated with control of the power regulator, a sum of the first current and the second current being substantially constant;

means for generating a first voltage and a second voltage based, respectively, on the first current and the second current;

means for comparing the first voltage and the second voltage and for providing an output signal in response to the comparison of the first voltage and the second voltage; and means for charging a capacitor to increase the soft-start reference voltage in response to the output signal.

18. The system of claim 17, further comprising means for coupling the soft-start reference voltage to an input reference voltage that is associated with the power regulator upon the soft-start reference voltage being less than the input reference voltage by a predetermined magnitude, the predetermined magnitude being based on a configuration of the means for generating the first current and the second current.

19. The system of claim 17, further comprising means for providing a third current, the third current contributing to a magnitude of the second voltage, the means for providing the third current being configured to deactivate in response to the soft-start reference voltage achieving a predetermined magnitude to set the second voltage less than the first voltage to latch the soft-start reference voltage at a constant magnitude.

20. The system of claim 17, wherein the means for generating the first current and the second current comprises means for increasing a magnitude of the first current relative to the second current in response to the increase of the soft-start reference voltage, the output signal changing state upon the first voltage being substantially equal to the second voltage.

* * * * *